US010682983B2

(12) United States Patent
Santavicca et al.

(10) Patent No.: US 10,682,983 B2
(45) Date of Patent: Jun. 16, 2020

(54) DEVICE FOR SECURE TIRE AND WHEEL PROTECTION

(71) Applicant: VOXX INTERNATIONAL CORPORATION, Hauppauge, NY (US)

(72) Inventors: Joseph Anthony Santavicca, Macomb, MI (US); Benson James Brady, Detroit, MI (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

(21) Appl. No.: 16/240,966

(22) Filed: Jan. 7, 2019

(65) Prior Publication Data

US 2019/0210568 A1   Jul. 11, 2019

Related U.S. Application Data

(60) Provisional application No. 62/614,019, filed on Jan. 5, 2018.

(51) Int. Cl.
  *B60R 25/30*   (2013.01)
  *B60R 25/34*   (2013.01)
  *B60R 25/10*   (2013.01)
  *B60R 25/00*   (2013.01)

(52) U.S. Cl.
  CPC .......... *B60R 25/34* (2013.01); *B60R 25/1004* (2013.01); *B60R 25/30* (2013.01); *B60R 25/00* (2013.01); *B60R 25/001* (2013.01); *B60R 2025/1016* (2013.01); *B60R 2325/105* (2013.01)

(58) Field of Classification Search
  CPC ... B60R 25/00; B60R 25/001; B60R 25/1004; B60R 25/1001; B60R 25/2036
  See application file for complete search history.

(56) References Cited

U.S. PATENT DOCUMENTS

| | | | |
|---|---|---|---|
| 5,801,618 A | 9/1998 | Jenkins et al. | |
| 6,092,078 A | 7/2000 | Adolfsson | |
| 6,100,792 A | 8/2000 | Gino et al. | |
| 6,856,820 B1 | 2/2005 | Kolls | |
| 2003/0227395 A1* | 12/2003 | Zeineh | G01C 21/26 340/988 |
| 2005/0088280 A1 | 4/2005 | Beehler et al. | |
| 2007/0096884 A1* | 5/2007 | Takashima | B60R 25/1004 340/429 |
| 2007/0152798 A1 | 7/2007 | Witkowski | |
| 2007/0200688 A1 | 8/2007 | Tang et al. | |

(Continued)

FOREIGN PATENT DOCUMENTS

EP      1255235      11/2002

OTHER PUBLICATIONS

International Search Report issued in corresponding application No. PCT/US19/12471 dated Mar. 27, 2019.

(Continued)

*Primary Examiner* — Benyam Haile
(74) *Attorney, Agent, or Firm* — F. Chau & Associates, LLC

(57) ABSTRACT

A device for secure tire and wheel protection including: a control module, the control module including: an interface for connecting the control module to a factory alarm of a vehicle; a tilt sensor; and a glass break sensor.

8 Claims, 4 Drawing Sheets

(56) References Cited

U.S. PATENT DOCUMENTS

| | | | |
|---|---|---|---|
| 2008/0195273 A1* | 8/2008 | Matsuura | B60R 25/04 701/29.2 |
| 2009/0066488 A1* | 3/2009 | Qiahe | B60R 25/102 340/426.1 |
| 2010/0219951 A1* | 9/2010 | Sosa | B60R 25/1004 340/551 |
| 2017/0190312 A1 | 7/2017 | Barrios et al. | |
| 2017/0327080 A1* | 11/2017 | Weinfurther | B60R 25/1001 |

OTHER PUBLICATIONS

Written Opinion issued in corresponding application No. PCT/US19/12471 dated Mar. 27, 2019.

* cited by examiner

DEVICE FOR SECURE TIRE AND WHEEL PROTECTION

CROSS-REFERENCE TO RELATED APPLICATION

This application claims priority under 35 U.S.C. § 119/120 to U.S. provisional application No. 62/614,019, filed on Jan. 5, 2018 in the U.S. Patent and Trademark Office, the disclosure of which is incorporated by reference herein in its entirety.

TECHNICAL FIELD

The present invention relates to wheel and tire security, and more particularly to a device for secure tire and wheel protection.

SUMMARY

According to an exemplary embodiment of the present invention, a device for secure tire and wheel protection comprises: a control module, the control module including: an interface for connecting the control module to a factory alarm of a vehicle; a tilt sensor; and a glass break sensor. The glass break sensor is connected to a microphone. The control module further includes a programming button and status indicator. The control module further includes a sensitivity adjustor for the glass break sensor. The control module further includes a software upgrade port. The control module further includes a microcontroller configured to control the device to arm when the vehicle is turned off. The control module further includes a transceiver. The transceiver is configured to transmit a radio frequency (RF) packet. The RF packet includes an event ID, an event type, a vehicle ID, a lot ID, a command ID, a command type, a security ID and synch, an undefined data payload, and a checksum.

According to an exemplary embodiment of the present invention, there is provided a device to trigger an existing original equipment manufacturer (OEM) alarm of a vehicle comprising: a housing, the housing including: an interface for connecting the housing to the OEM alarm; a tilt sensor; a glass break sensor; a microcontroller; a transceiver; a power management circuit; and an upgrade port.

According to an exemplary embodiment of the present invention, there is provided a system for lot protection comprising: a first device for secure tire and wheel protection, the first device including a first control module, the first control module including: a first interface for connecting the first control module to a factory alarm of a vehicle; a first tilt sensor; a first glass break sensor; and a first transceiver; and a second device for secure tire and wheel protection, the second device including a second control module, the second control module including: a second interface for connecting the second control module to the factory alarm of the vehicle; a second tilt sensor; a second glass break sensor; and a second transceiver.

DETAILED DESCRIPTION OF EXEMPLARY EMBODIMENTS

Figure 1:
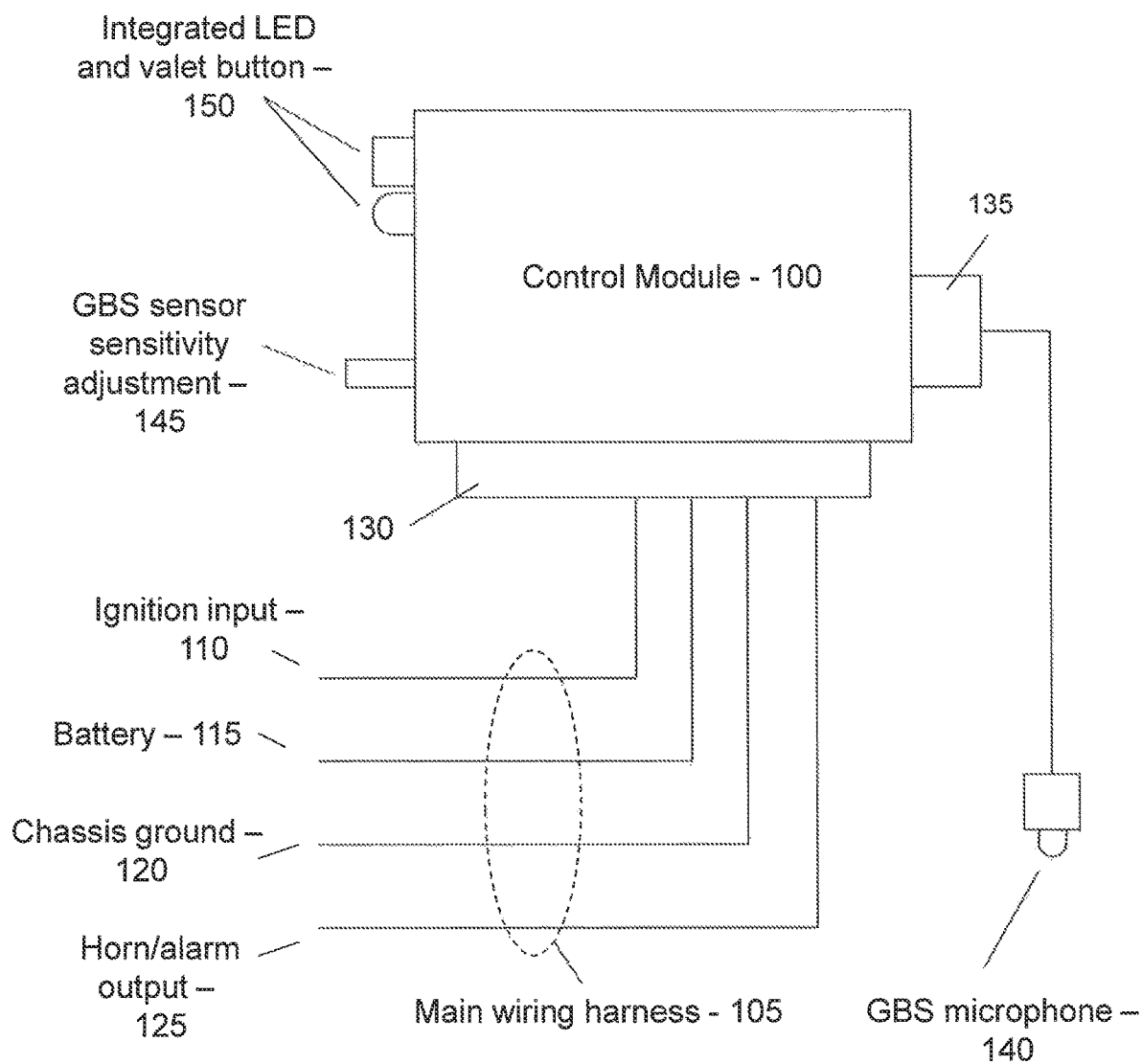
FIG. 1 is a system diagram of a device for secure tire and wheel protection according to an exemplary embodiment of the present invention.

In accordance with an exemplary embodiment of the present invention herein is disclosed a device for secure tire and wheel protection. The device is designed to be a quick and easy installation to add security features to protect tires/wheels and content theft protection to dealership and customer vehicles. The device can be used to draw attention to a theft in progress with lights flashing and horn sounding to keep a thief away and have them move on to an easier target.

The device has a number of features. For example, the device functions independently of a factory alarm, has a programmable button and status LED, and is used as a stand-alone sensor to trigger an existing OEM alarm. In addition, the device may include a glass break detection sensor to trigger an alarm in the event a window is broken, the device may have a hardwired output for the factory alarm trigger, and may include a sensitivity knob for adjusting the glass break sensor. Further, the device may include an external microphone and a port for programming/software update.

Additional features may include a nuisance prevention feature. For example, if a sensor is triggered three times less than 60 minutes apart, the triggered sensor could be bypassed/ignored until ignition ON/OFF is cycled. The device can monitor ignition/accessory voltage and arm 30 seconds after the vehicle is turned off. The tilt sensor can automatically calibrate a new 'zero' position within 30 seconds of ignition off or arming. The tilt sensor can trigger an alarm mode when any +/−2 degree tilt angle change of the vehicle is detected and sustained for one second to within the available accuracy of the tilt sensor itself so as to eliminate any false trigger events. In addition, if a tilt is triggered, and the vehicle is left at the angle when triggered, the device can wait two minutes and learn this new position as the new 'zero' point to prevent any further false triggers, and maintain protection of the vehicle.

The device may further include a transceiver. For example, the device may be capable of transmitting 315 MHz, 433 MHz and 902 MHz. The device can receive an RF message from other devices. When in lot mode, any triggered device can send an RF trigger message to all devices in range. The device may employ an RKE learn process by which the device is learned to the factory RKE. The device may also employ a TPM learn process to learn individual tire pressure monitor (TPM) sensors. For example, TPM sensors may send an immediate pressure value when rapid deflation occurs, even if the car is parked—this could be registered as a theft attempt and trigger the horn.

A master lock message can be sent from an ACM keypad or similar device, then hop from device to device until the entire lot is locked. A car find message can be sent from an ACM keypad or similar device, and can hop from device to device to cause a specific device to honk horn/RKE panic for a few seconds. The device may further include Bluetooth capability and be coupled to an app that enables a smartphone to be used as a remote. In addition, the device can connect to RF controlled relays for starter kill and horn.

Further, a real time clock can be used to arm the device only at night such that false alarms can be reduced when the dealer is active during the day.

FIG. 1 is a system diagram of a device for secure tire and wheel protection according to an exemplary embodiment of the present invention.

As shown in FIG. 1, there is provided a control module 100 connected to components of a vehicle through the vehicle's main wiring harness 105, for example. The control module 100 may be connected to an ignition input 110 of the vehicle, a battery 115 of the vehicle, a chassis ground 120 of the vehicle and a horn/alarm output 125 of the vehicle. It is to be understood, however, that the control module 100 can be connected to a variety of other components of the vehicle not shown in this figure.

The control module 100 includes an interface 130 for connecting to the main wiring harness 105, an interface 135 for connecting to a glass break sensor (GBS) microphone 140, a GBS sensor sensitivity adjustment 145, and an integrated LED and valet button 150. The GBS sensor sensitivity adjustment 145 may be a knob engraved with position settings, e.g., 1-9, easily accessible for an installer. The setting '1' may disable GBS function. The setting '5' may be a baseline reference sensitivity for GBS, allowing to adjust up or down to increase or decrease sensitivity. The controller module 100 may further include other components such as a self-calibrating tilt sensor, a GBS, a microprocessor and a power management circuit. These components will be described in more detail below with reference to FIGS. 2A, 2B and 3.

Figure 2A:
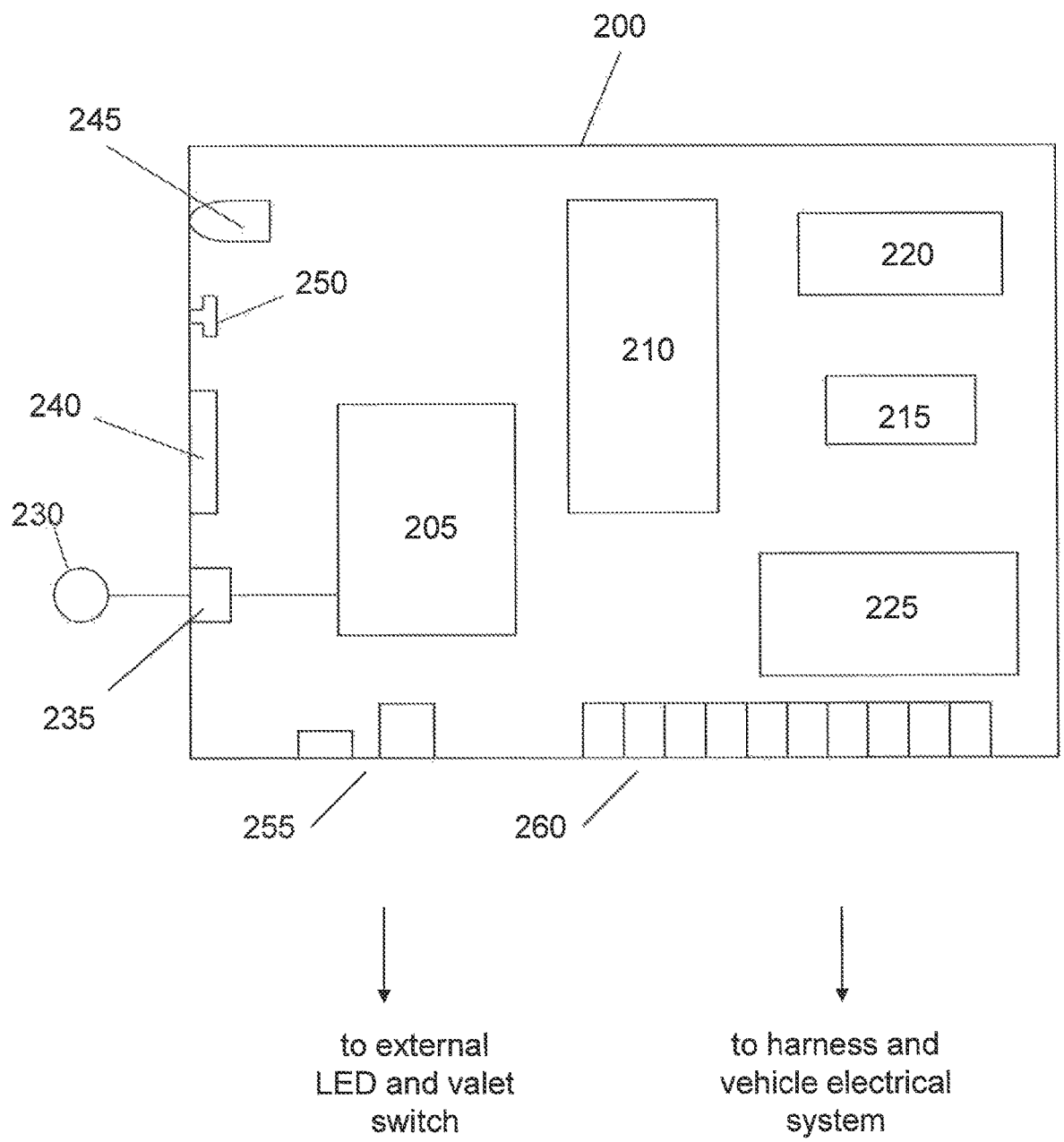
FIG. 2A is a block diagram of a device for secure tire and wheel protection according to an exemplary embodiment of the present invention.

FIG. 2A is a block diagram of a device for secure tire and wheel protection according to an exemplary embodiment of the present invention.

As shown in FIG. 2A, there is provided a control module 200 that includes a glass break circuit 205, a microcontroller 210, a tilt sensor 215, a power circuit 220 and a transceiver 225. The glass break circuit 205 may be connected to an external microphone 230 via a port 235. The control module 200 further includes a software upgrade port 240, an LED 245 for status indication, a button 250 for programming and interfaces 255 and 260. The components of the control module 200 may be communicably coupled to one another via a data bus. The control module 200 may include additional components such as a shock sensor.

The interface 255 may be used to connect the control module 200 to an external LED, e.g., a status LED, and an external valet switch. The interface 260 may be used to wire the control module 200 to a vehicle's electric system. The interface 260 may include a plurality of terminals for connections to vehicle components, e.g., ignition input, alarm trigger output, lock input, unlock input, light input, ground and +12V.

The microcontroller 210 includes software that enables the control module 200 to detect the type of vehicle it is connected to such that the control module 200 can automatically configure itself to operate with an RF protocol of the vehicle. In other words, the control module 200 can seamlessly communicate with the factory keyless entry system of the vehicle. The software supports many vehicle makes and models. In addition, the control module 200 can be programmed via its upgrade port 240 to facilitate learning a new vehicle. Further, by utilizing components such as the microcontroller 210 and the transceiver 225, the control module 200 can learn the vehicle as an RKE fob. Thus, for example, when the control module 200 is installed in a vehicle, if the vehicle is titled, the control module 200 will send a panic signal to the factory keyless entry system. It is to be understood, however, that the panic signal can be sent wirelessly from the control module 200 like that sent by a key fob to the factory keyless entry system.

The control module 200 can also communicate with other like control modules installed in other vehicles. For example, control module 200 can receive an RF trigger message from other vehicles. In addition, the control module 200 can communicate with an ACM operated by a dealer. In this case, there is provided a lot mode function that allows all control modules to be turned on or off in the lot by using the ACM. The ACM may be a computing device programmed to wirelessly control vehicles in a dealer lot. The ACM may employ RF or Bluetooth transmitters for wireless control.

When a plurality of control modules are installed in vehicles on a dealer lot, they may be programmed such that when one module is triggered, the triggered devices sends an RF message to trigger all control modules in range. In this case, rather than one car alarm going off when a thief is attempting to steal its tires, a plurality of car alarms go off. This can more effectively scare off a thief and alert lot employees to the disturbance.

Figure 2B:
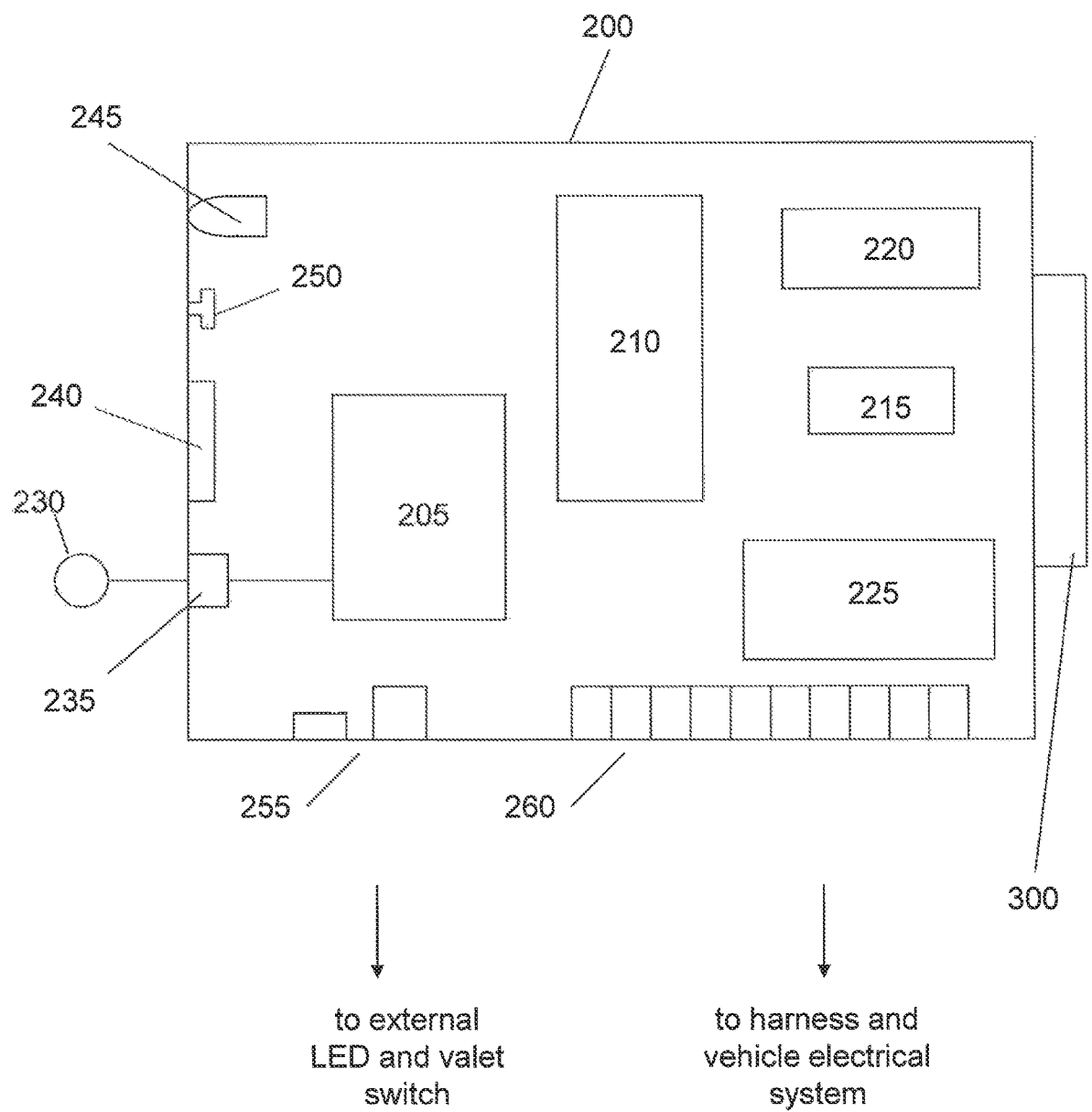
FIG. 2B is a block diagram of a device for secure tire and wheel protection according to an exemplary embodiment of the present invention.

FIG. 2B is a block diagram of a device for secure tire and wheel protection according to an exemplary embodiment of the present invention. The majority of the components in FIG. 2B are the same as those shown in FIG. 2A, thus the same reference numbers used. Differences between the two figures will be mainly discussed.

For example, in FIG. 2B, the control module 200 includes an OBI) terminal 300 for connecting to an OBD port of a vehicle. The control module 200 may simply plug into a vehicle's OBD port. The control module 200 can then be used to access the CAN bus and diagnostics of the vehicle. In this case, for example, the control module 200 can see bus traffic and send messages. The vehicle's OBD connector can be used for battery, ground and ignition input. In this case, the interface 260 may connect to vehicle components as such: lock output, unlock output, starter cut output, ignition input, horn output, lock input, unlock input, and light input.

As described with reference to FIGS. 1, 2A and 2B, there can be configured a sensors module (including tilt/accelerometer and glass break microphone) with a trigger output wire and an inhibit input. The inhibit input may be IGN or ACC or an armed control input from the security system. The sensors module can further include the RF transceiver and additional inputs/outputs so that it can be a low cost security module with on-board RF and on-board sensors. Other alternatives include using the horn output as the trigger wire like a shock sensor to trigger a factory alarm. In addition, voltage sensing for IGN (run) can be used to add passive arming.

Figure 3:
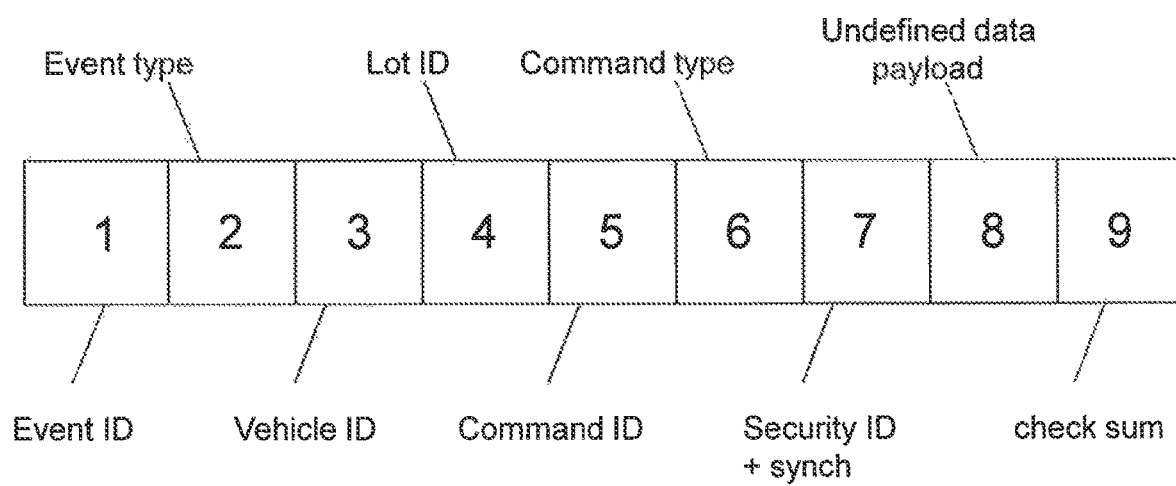
FIG. 3 is a radio frequency packet of a device for secure tire and wheel protection according to an exemplary embodiment of the present invention.

FIG. 3 is a radio frequency packet of a device for secure tire and wheel protection according to an exemplary embodiment of the present invention.

As shown in FIG. 3, the packet may include a plurality of fields 1-9. The fields may contain, but are not limited to, event ID, event Type, vehicle ID, Lot ID, Command ID, Command Type, security ID+sync, undefined data payload, and check sum. Certain fields such as event Type and Command Type can be used to tell control modules not to resend RF signals sent thereto. In other words, those fields can be used like an expiry bit. For example, if a message is destined for a particular control module and it is received at that control module, the message will not be retransmitted. In addition, if a message is destined for five control modules, the messages are retransmitted from other control modules until the message is received by the five control modules.

Further, if the message is received by a particular control module more than a preset number of times, that control module may not retransmit the message. In other words, retransmission limits may be set.

In addition, plural devices in the lot may use the same RF channel. Thus, if in lot mode and a transmitter is used to arm/disarm a car, the signal from the transmitter may be hopped from one device to another until, for example, its destination is reached. In other words, the plural devices may form a mesh. Here, command, control and status signals may be passed through the mesh. The mesh may be a Bluetooth mesh.

In an exemplary embodiment of the present invention, messages can propagate from device to device, e.g., control module to control module; however, a device may never repeat a message with the same event ID more than once. There can be several modes of operation that could be identified based on the event Type, Command Type and Command ID. These modes will allow the device to respond to specific RF message types and propagate messages or not. The messages can be in one of a few types listed below.

Specific vehicle commands {lock, unlock, find, set consumer mode, set lot mode, mode settings, option settings}. Specific vehicle commands may or may not be set to propagate depending on dealer preference and settings.

Global commands (lot specific) {lock/arm all, set time, lot silence (this can shut down alarming units)}. It is to be understood that 'lot silence' may not be a global disarm of all vehicles, but only applies to the alarms are already actively sounding. Global commands can always propagate.

Trigger event broadcast {wheel theft trigger announcement}. Trigger events messages can always transmit. The module can be set to—react but not propagate, react and propagate once, not react, and not react but propagate.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A device for secure tire and wheel protection, comprising:
   a control module configured to automatically arm when a vehicle is turned off, the control module including:
   an interface for connecting the control module to a factory alarm of the vehicle;
   a tilt sensor, wherein the tilt sensor automatically calibrates to a new zero position within a predeterminded time after the vehicle is turned off;
   a glass break sensor; and
   a transceiver configured to wirelessly trigger the factory alarm of the vehicle;
   wherein the device is configured to be programmed to the vehicle.

2. The device of claim 1, wherein the glass break sensor is connected to a microphone.

3. The device of claim 1, wherein the control module further includes a programming button and status indicator.

4. The device of claim 1, wherein the control module further includes a sensitivity adjustor for the glass break sensor.

5. The device of claim 1, wherein the control module further includes a software upgrade port.

6. The device of claim 1, wherein the control module further includes a microcontroller configured to control the device to arm when the vehicle is turned off.

7. The device of claim 1, wherein the transceiver is configured to transmit a radio frequency (RF) packet.

8. The device of claim 7, wherein the RF packet includes an event ID, an event type, a vehicle ID, a lot ID, a command ID, a command type, a security ID, an undefined data payload, and a checksum.

* * * * *